(12) United States Patent
Ohsawa et al.

(10) Patent No.: US 8,184,404 B2
(45) Date of Patent: May 22, 2012

(54) SUSPENSION BOARD WITH CIRCUIT

(75) Inventors: Tetsuya Ohsawa, Osaka (JP); Toshiki Naito, Osaka (JP)

(73) Assignee: NITTO DENKO Corporation, Osaka (JP)

( * ) Notice: Subject to any disclaimer, the term of this patent is extended or adjusted under 35 U.S.C. 154(b) by 375 days.

(21) Appl. No.: 12/656,053

(22) Filed: Jan. 14, 2010

(65) Prior Publication Data

US 2010/0188779 A1    Jul. 29, 2010

Related U.S. Application Data

(60) Provisional application No. 61/202,251, filed on Feb. 10, 2009.

(30) Foreign Application Priority Data

Jan. 23, 2009    (JP) .................................. 2009-013515

(51) Int. Cl.
G11B 5/02 (2006.01)
G11B 11/10 (2006.01)
G11B 11/105 (2006.01)
G11B 5/60 (2006.01)

(52) U.S. Cl. .................................. 360/245.8; 360/234.5

(58) Field of Classification Search ............... 360/245.8, 360/244.1, 245.5, 234.5, 59
See application file for complete search history.

(56) References Cited

U.S. PATENT DOCUMENTS

| 6,110,330 | A | 8/2000 | Lini et al. |
| 6,139,936 | A | 10/2000 | Weiss |
| 6,166,888 | A | 12/2000 | Tsuda et al. |
| 6,400,529 | B1 | 6/2002 | Baba et al. |
| 6,459,548 | B1 | 10/2002 | Shiraishi et al. |
| 7,643,248 | B2 * | 1/2010 | Sluzewski .................. 360/234.4 |
| 2003/0107843 | A1 | 6/2003 | Hanya et al. |
| 2003/0227718 | A1 | 12/2003 | Ishikawa |
| 2004/0089638 | A1 | 5/2004 | Tanaka |
| 2005/0045601 | A1 | 3/2005 | Kashima et al. |
| 2006/0039084 | A1 | 2/2006 | Kashima |
| 2006/0187564 | A1 | 8/2006 | Sato et al. |
| 2006/0266471 | A1 | 11/2006 | Tanaka |
| 2007/0177302 | A1 | 8/2007 | Shimazawa et al. |
| 2007/0242921 | A1 | 10/2007 | Matsumoto |
| 2007/0247760 | A1 | 10/2007 | Hanya et al. |
| 2008/0115962 | A1 | 5/2008 | Juni et al. |
| 2008/0130155 | A1 | 6/2008 | Naniwa et al. |

(Continued)

FOREIGN PATENT DOCUMENTS

JP        07-078436        3/1995

(Continued)

Primary Examiner — Will J Klimowicz
(74) Attorney, Agent, or Firm — Jean C. Edwards, Esq.; Edwards Neils PLLC

(57) ABSTRACT

A suspension board with circuit includes a board main body portion, an auxiliary portion folded back with respect to the board main body portion, a slider disposed close to the board main body portion, and mounting thereon a magnetic head, and a light emitting element disposed close to the auxiliary portion. The conductive pattern includes a first conductive pattern including a first terminal, and a second terminal connected to the magnetic head, and a second conductive pattern including a third terminal and a fourth terminal connected to the light emitting element. The first, second and third terminals are disposed on the board main body portion. The fourth terminal is disposed on the auxiliary portion. The back surface of the board main body portion is formed with a main-body-side interfitting portion. A back surface of the auxiliary portion is formed with an auxiliary-portion-side interfitting portion.

6 Claims, 11 Drawing Sheets

U.S. PATENT DOCUMENTS

| | | | |
|---|---|---|---|
| 2009/0310908 A1* | 12/2009 | Kanagawa et al. | 385/14 |
| 2010/0110590 A1* | 5/2010 | Ohsawa et al. | 360/234.5 |
| 2010/0118443 A1* | 5/2010 | Ohsawa et al. | 360/245.8 |
| 2010/0118445 A1* | 5/2010 | Ohsawa et al. | 360/246.2 |
| 2010/0188779 A1* | 7/2010 | Ohsawa et al. | 360/246.1 |
| 2010/0328807 A1* | 12/2010 | Snyder et al. | 360/59 |
| 2011/0216635 A1* | 9/2011 | Matsumoto | 369/13.33 |

FOREIGN PATENT DOCUMENTS

| | | |
|---|---|---|
| JP | 10-241133 | 9/1998 |
| JP | 10-293915 | 11/1998 |
| JP | 2000-348451 A | 12/2000 |
| JP | 2001-023138 A | 1/2001 |
| JP | 2002-216327 A | 8/2002 |
| JP | 2003-045004 A | 2/2003 |
| JP | 2003-173643 A | 6/2003 |
| JP | 2004-154836 A | 6/2004 |
| JP | 2005-071465 A | 3/2005 |
| JP | 2006-059464 A | 3/2006 |
| JP | 2006-185548 A | 7/2006 |
| JP | 2007-52918 | 3/2007 |
| JP | 2007-157209 A | 6/2007 |
| JP | 2007-207349 | 8/2007 |
| JP | 2007-280572 | 10/2007 |
| JP | 2007-287296 A | 11/2007 |
| JP | 2008-034091 | 2/2008 |
| JP | 2008-130106 | 6/2008 |
| JP | 2008-152899 | 7/2008 |
| WO | WO 02/050835 A1 | 6/2002 |

* cited by examiner

SUSPENSION BOARD WITH CIRCUIT

CROSS-REFERENCE TO RELATED APPLICATIONS

This patent application claims the benefit of U.S. Provisional Application No. 61/202,251, filed on Feb. 10, 2009, and claims priority from Japanese Patent Application No. 2009-013515, filed on Jan. 23, 2009, the contents of which are herein incorporated by reference in their entirety.

BACKGROUND OF THE INVENTION

1. Field of the Invention

The present invention relates to a suspension board with circuit and, more particularly, to a suspension board with circuit used in a hard disk drive in which an optically assisted method is employed.

2. Description of the Related Art

In recent years, it has been known to use a suspension board with circuit in a hard disk drive in which an optically assisted method is employed. The optically assisted method is a recording method in which, when information is to be recorded, light is emitted from a light emitting element toward a magnetic disk to irradiate and heat the magnetic disk, and the information is recorded by a magnetic head on the magnetic disk having a reduced coersive force as a result of being irradiated and heated with the light. Because the optically assisted method enables high-density recording of information with a small recording magnetic field, the development thereof has been advanced in recent years.

In an attempt to employ such an optically assisted method, there has been proposed a suspension board with circuit which includes, e.g., a metal supporting board, a light emitting element mounted on a surface (upper surface) of the metal supporting board, and a slider (see, e.g., Japanese Unexamined Patent No. 2008-152899).

The suspension board with circuit proposed in Japanese Unexamined Patent No. 2008-152899 further includes a terminal portion (element-side terminal portion) of a supply wire electrically connected to the light emitting element, and a head-side connection terminal portion electrically connected to a magnetic head mounted on the slider. The element-side terminal portion and the head-side connection terminal portion are formed on the same surface of the metal supporting board.

SUMMARY OF THE INVENTION

However, according to Japanese Unexamined Patent No. 2008-152899, both of the light emitting element and the slider are mounted on the same surface of the metal supporting board, so that the element-side terminal portion and the head-side connection terminal portion are also formed on the same surface of the metal supporting board. As a result, the element-side terminal portion and the head-side connection terminal portion should be arranged at a high density, leading to a problem that a short circuit easily occurs therebetween.

When the short circuit is to be prevented, it is necessary to ensure a large space for the disposition of the element-side terminal portion and the head-side connection terminal portion. However, this results in a problem that the suspension board with circuit cannot be compactly mounted in a hard disk drive.

There is also a problem that, since the light emitting element and the slider are both mounted on the same surface of the metal supporting board, a restriction associated with layout design arises.

It is therefore an object of the present invention to provide a suspension board with circuit employing an optically assisted method which can be compactized, while allowing individual types of terminals to be arranged at low densities.

A suspension board with circuit of the present invention includes a conductive pattern, a board main body portion, an auxiliary portion formed continuously from the board main body portion, and folded back with respect to the board main body portion so as to face a back surface of the board main body portion, a slider disposed on a side of the suspension board with circuit which is closer to the board main body portion in a direction in which the board main body portion and the auxiliary portion face each other, and mounting thereon a magnetic head electrically connected to the conductive pattern, and a light emitting element disposed on a side of the suspension board with circuit which is closer to the auxiliary portion in the direction in which the board main body portion and the auxiliary portion face each other, and electrically connected to the conductive pattern, wherein the conductive pattern includes a first conductive pattern including a first terminal electrically connected to an external circuit, and a second terminal electrically connected to the magnetic head, and a second conductive pattern including a third terminal electrically connected to the external circuit, and a fourth terminal electrically connected to the light emitting element, wherein, in the first conductive pattern, both of the first terminal and the second terminal are disposed on the board main body portion, in the second conductive pattern, the third terminal is disposed on the board main body portion or on the auxiliary portion, and the fourth terminal is disposed on the auxiliary portion, the back surface of the board main body portion is formed with a main-body-side interfitting portion, a back surface of the auxiliary portion is formed with an auxiliary-portion-side interfitting portion, either one of the main-body-side interfitting portion and the auxiliary-portion-side interfitting portion is formed as a projecting portion, while the other of the main-body-side interfitting portion and the auxiliary-portion-side interfitting portion is formed as a depressed portion, the main-body-side interfitting portion and the auxiliary-portion-side interfitting portion interfit with each other, and the auxiliary portion is fixed to the board main body portion.

In the suspension board with circuit of the present invention, it is preferable that the auxiliary-portion-side interfitting portion includes a first auxiliary-portion-side interfitting portion disposed along a peripheral end portion of the auxiliary portion, and a second auxiliary-portion-side interfitting portion disposed so as to be surrounded by the first auxiliary-portion-side interfitting portion, and the main-body-side interfitting portion includes a first main-body-side interfitting portion facing the first auxiliary-portion-side interfitting portion, and a second main-body-side interfitting portion facing the second auxiliary-portion-side interfitting portion.

It is preferable that the suspension board with circuit of the present invention further includes a metal supporting board, and an insulating base layer formed on a surface of the metal supporting board, wherein the conductive pattern is formed on a surface of the insulating base layer, the projecting portion is formed of the metal supporting board, and the depressed portion is formed in the metal supporting board.

In the suspension board with circuit of the present invention, it is preferable that the slider and the light emitting element are disposed to face each other in a thickness direction.

In the suspension board with circuit of the present invention, it is preferable that the slider includes an optical waveguide, the light emitting element is disposed on a back surface of the slider so as to face the optical waveguide in a thickness direction, and each of the board main body portion and the auxiliary portion is formed with an opening extending therethrough in the thickness direction thereof so as to allow the light emitting element to be inserted through the opening.

In the suspension board with circuit of the present invention, it is preferable that the board main body portion is further formed with an adhesive fill hole to be filled with an adhesive, and the board main body portion and the auxiliary portion are joined together with the adhesive.

In the suspension board with circuit of the present invention, each of the first terminal, the second terminal, and the third terminal is disposed on the board main body portion, while the fourth terminal is disposed on the auxiliary portion. Alternatively, both of the first terminal and the second terminal are disposed on the board main body portion, while both of the third terminal and the fourth terminal are disposed on the auxiliary portion.

That is, the fourth terminal is disposed on the auxiliary portion different from the board main body portion on which the first terminal, the second terminal, and the third terminal are disposed. Alternatively, the third terminal and the fourth terminal are disposed on the auxiliary portion different from the board main body portion on which the first terminal and the second terminal are disposed.

This allows the individual types of terminals to be separately formed at low arrangement densities on the board main body portion and on the auxiliary portion. As a result, it is possible to prevent a short circuit therebetween, and consequently improve the connection reliability of the conductive pattern.

In addition, in the suspension board with circuit of the present invention, the auxiliary portion is folded back so as to face the back surface of the board main body portion. This allows the suspension board with circuit to be compactly mounted in a hard disk drive.

Further, in the suspension board with circuit, the slider and the light emitting element are located on both sides in the direction in which the board main body portion and the auxiliary portion face each other.

Therefore, by electrically connecting the magnetic head to the second terminal with increased layout design flexibility at the board main body portion, and electrically connecting the light emitting element to the fourth terminal with increased layout design flexibility at the auxiliary portion, the layout design flexibility of each of the slider and the light emitting element can be increased.

Moreover, in the suspension board with circuit, the main-body-side interfitting portion formed at the back surface of the board main body portion and the auxiliary-portion-side interfitting portion formed at the back surface of the auxiliary portion interfit with each other, and the auxiliary portion is fixed to the board main body portion.

Therefore, in the suspension board with circuit, the folded-back state of the auxiliary portion with respect to the substrate main body portion can be stabilized with a simple structure.

DETAILED DESCRIPTION OF THE INVENTION

Figure 1:
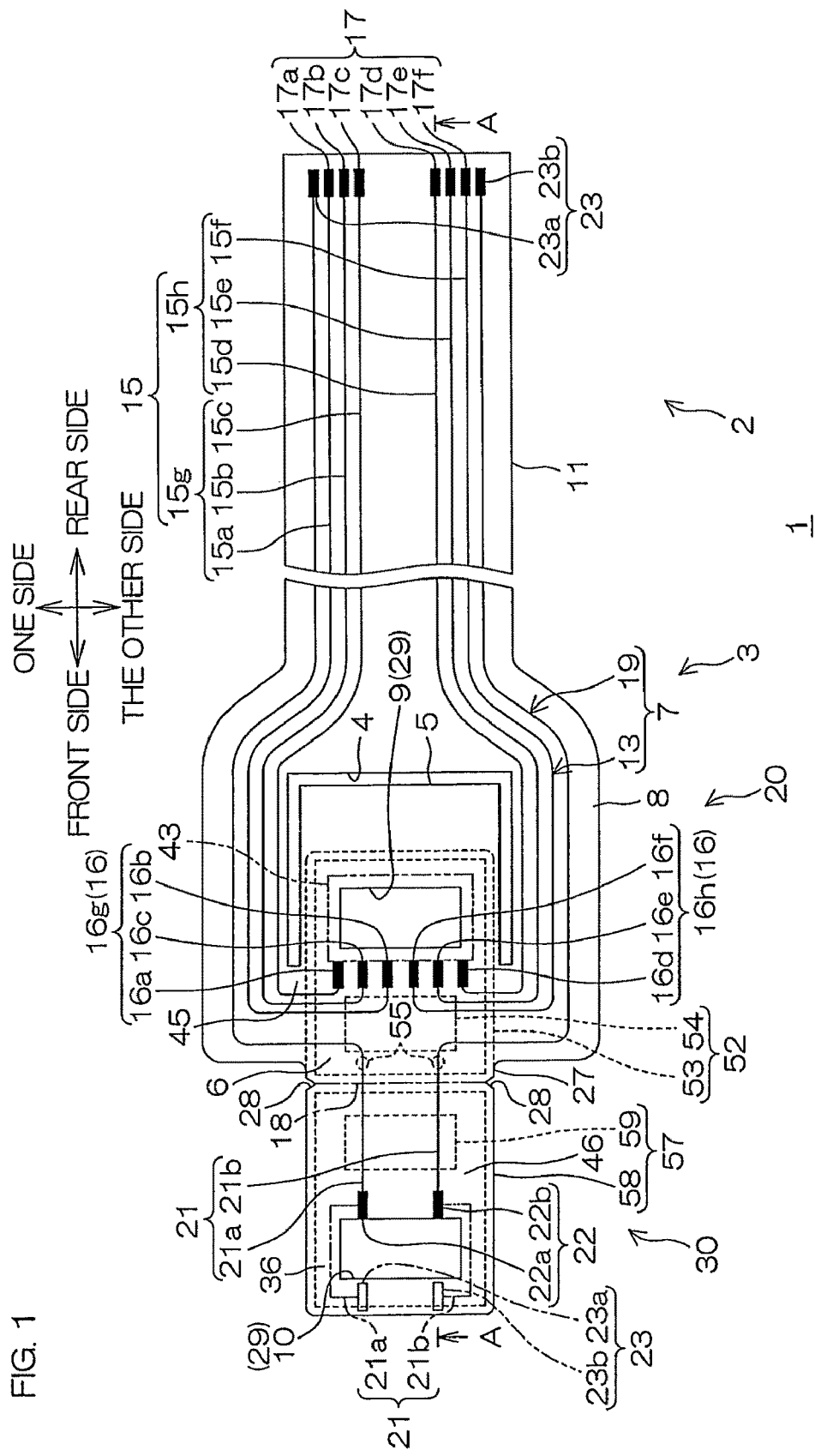
FIG. 1 is a plan view of a suspension board with circuit according to an embodiment of the present invention prior to a folding-back step.
Figure 2:
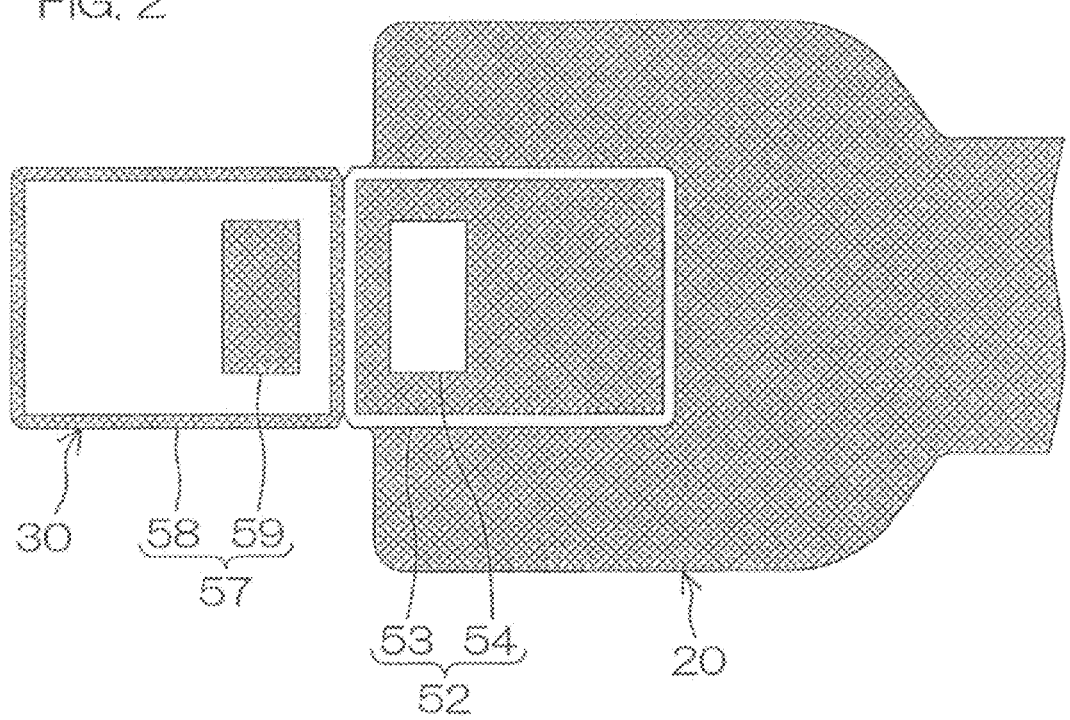
FIG. 2 is a schematic view of a principal portion of a metal supporting board of the suspension board with circuit shown in FIG. 1.
Figure 3:
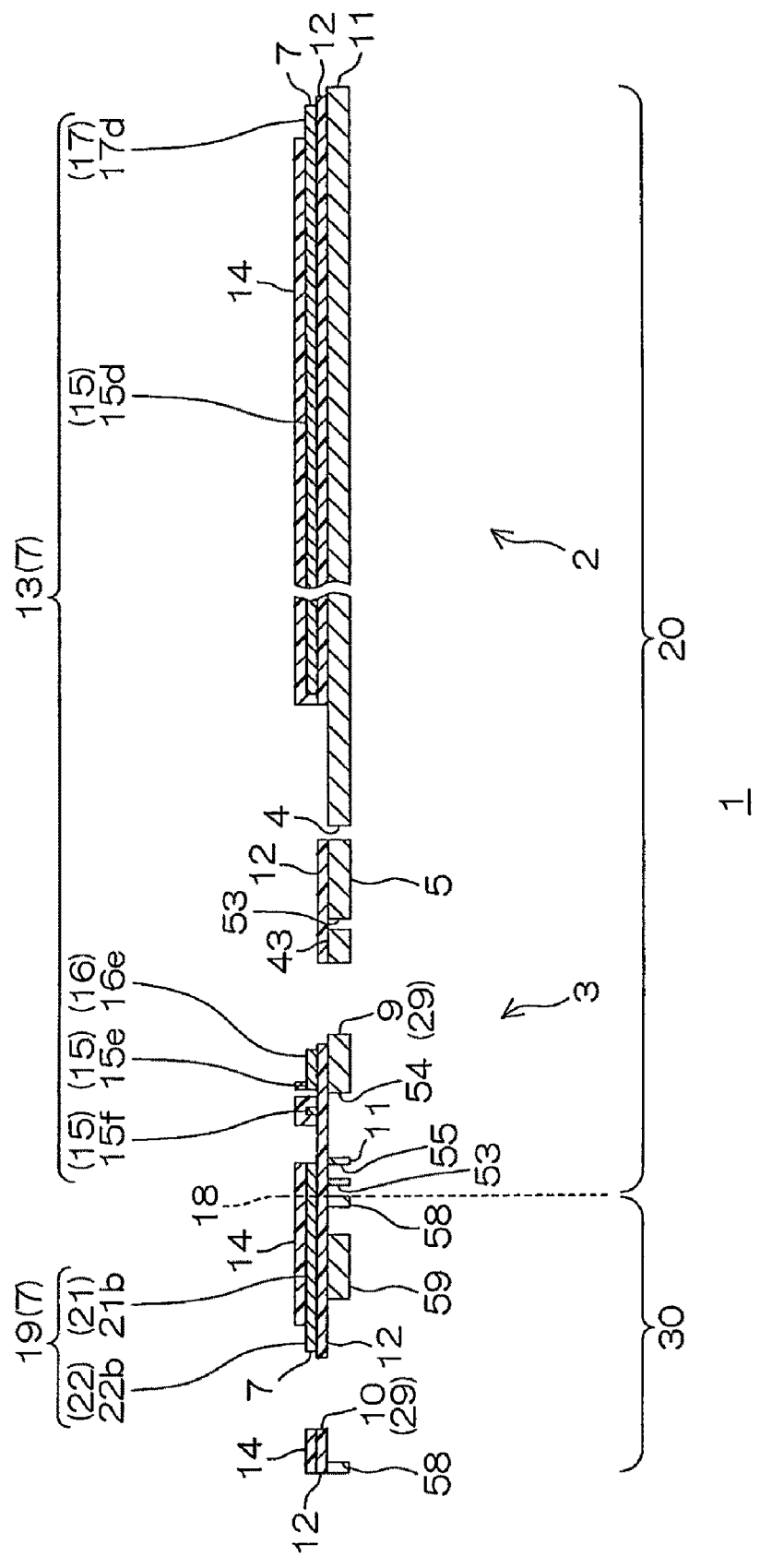
FIG. 3 is a cross-sectional view of the suspension board with circuit shown in FIG. 1 along the line A-A.
Figure 4:
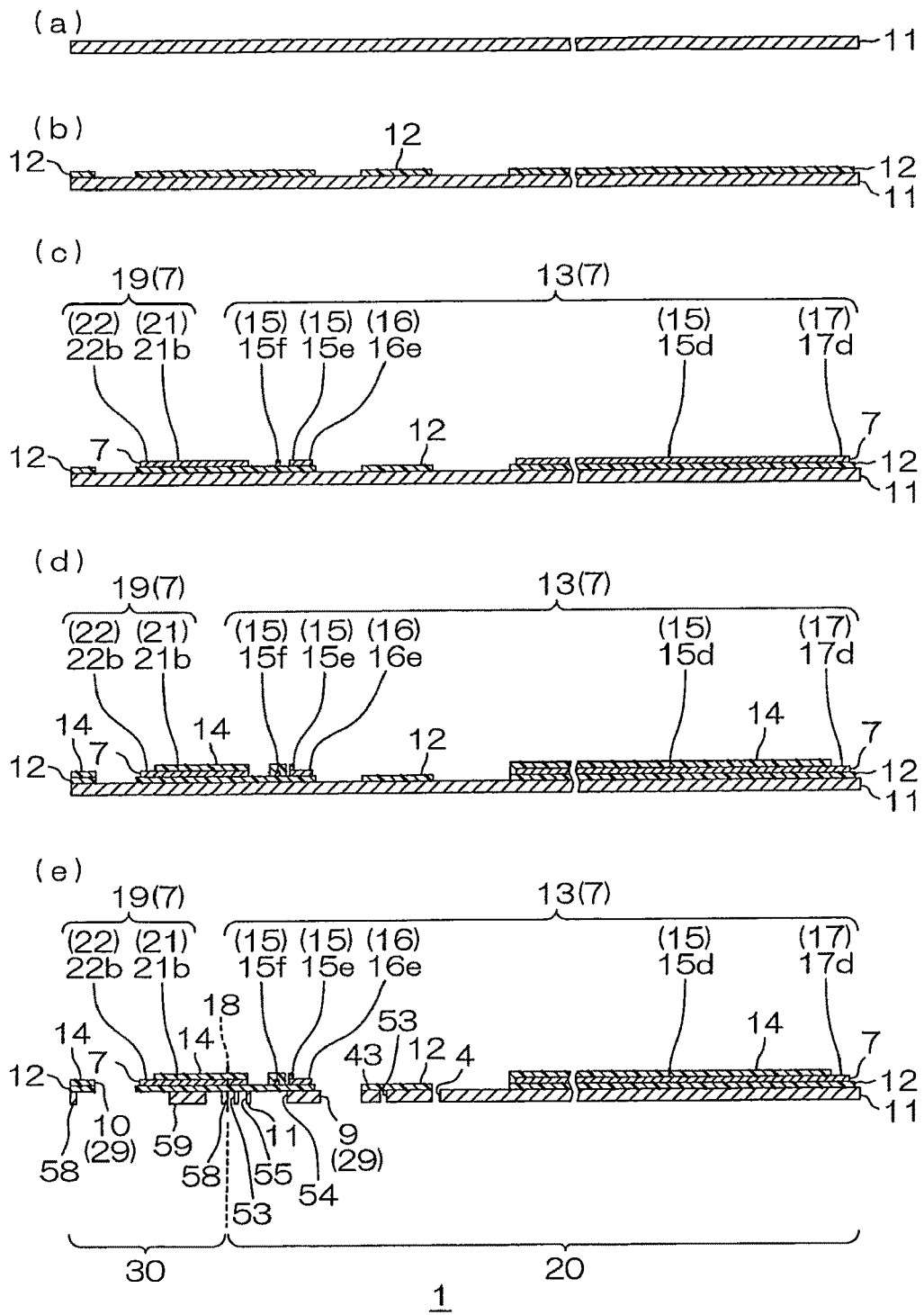
FIG. 4 is a process view for illustrating a producing method of the suspension board with circuit shown in FIG. 2, (a) showing the step of preparing the metal supporting board, (b) showing the step of forming an insulating base layer, (c) showing the step of forming a conductive pattern, (d) showing the step of forming an insulating cover layer, and (e) showing the step of forming a slit portion, a main-body-side insertion opening, an auxiliary-portion-side insertion opening, a main-body-side interfitting portion, adhesive fill holes, and an auxiliary-portion-side interfitting portion.
Figure 5:
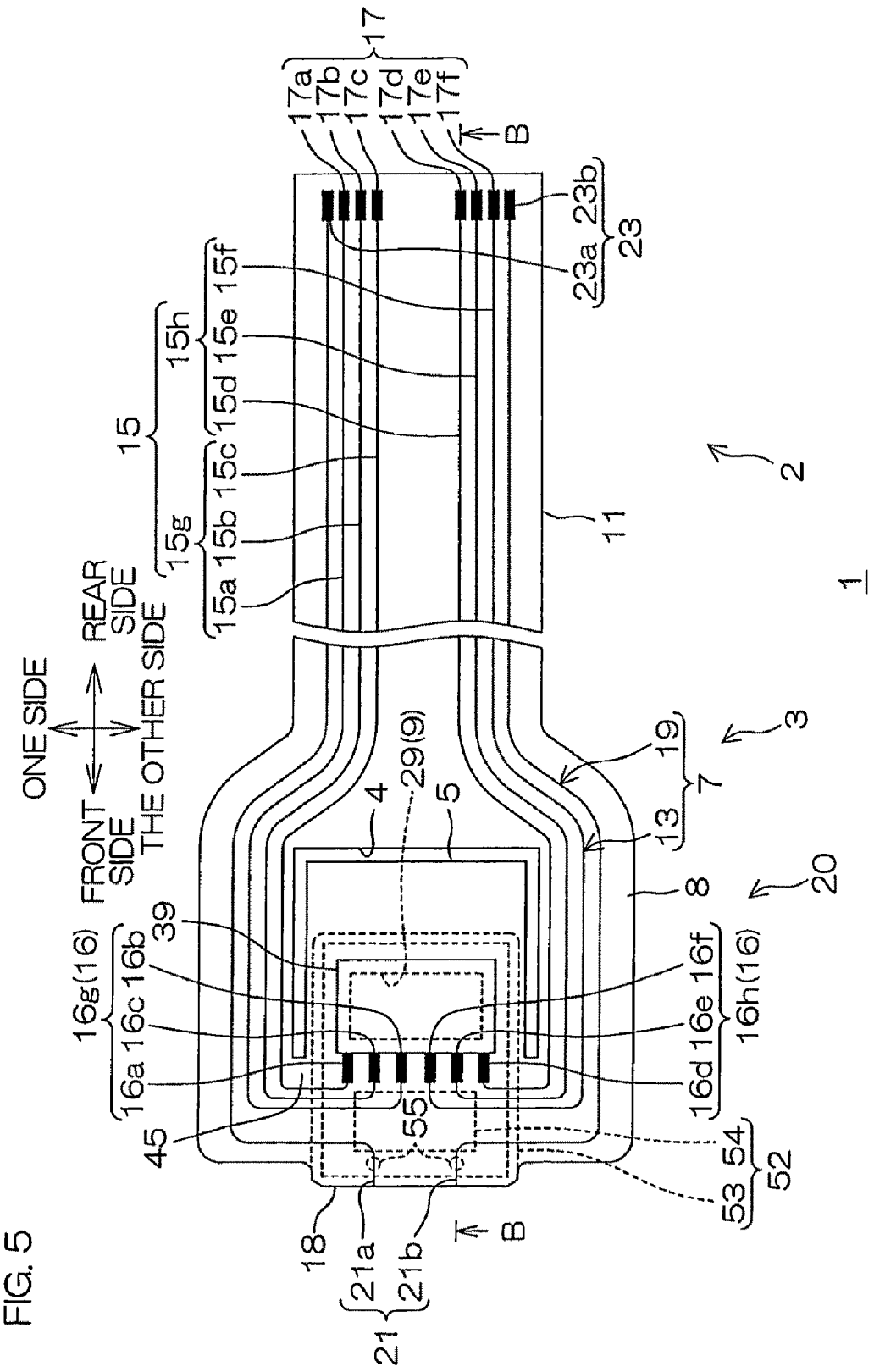
FIG. 5 is a plan view of the suspension board with circuit of FIG. 1 after the folding-back step.
Figure 6:
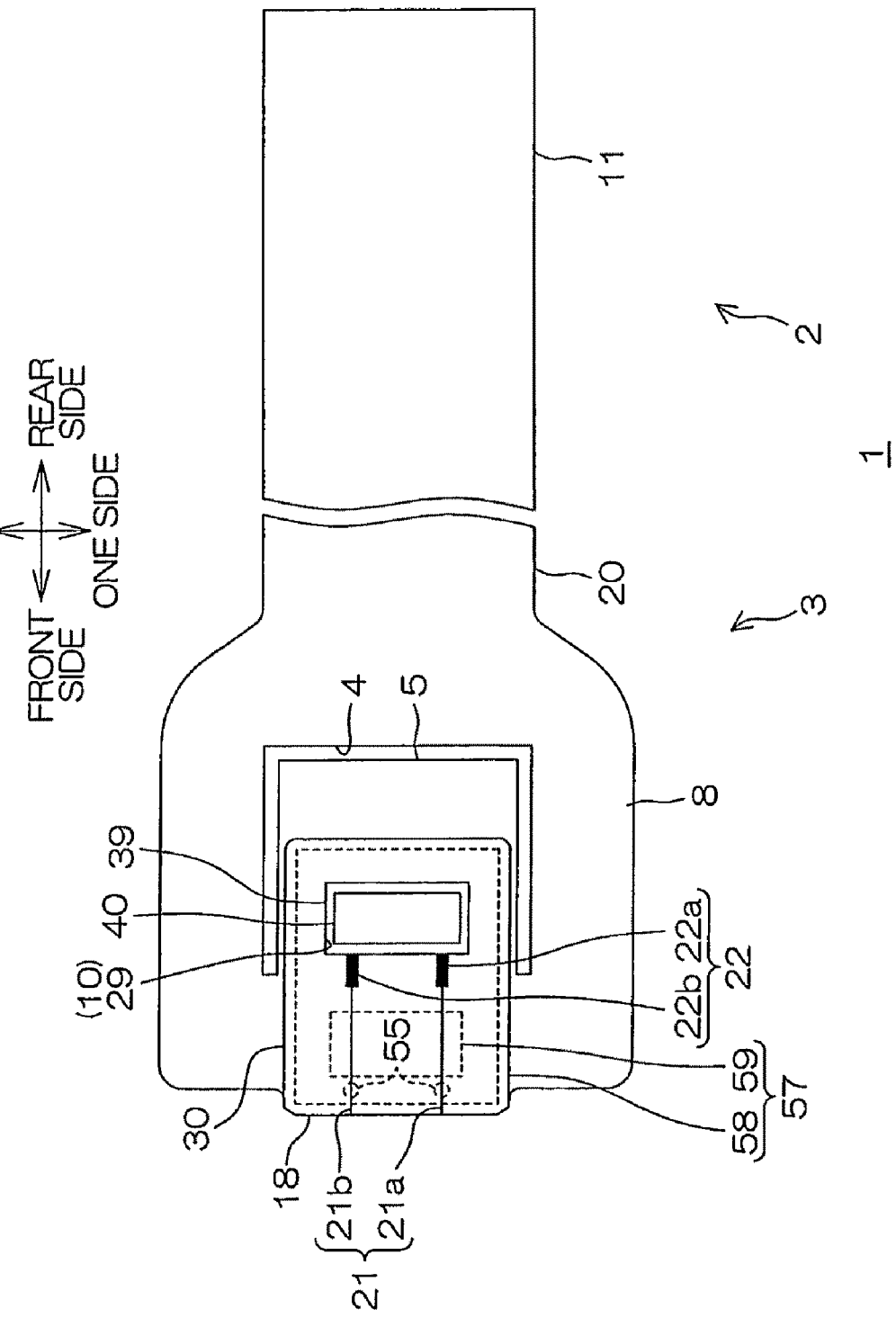
FIG. 6 is a bottom view of the suspension board with circuit of FIG. 5.
Figure 7:
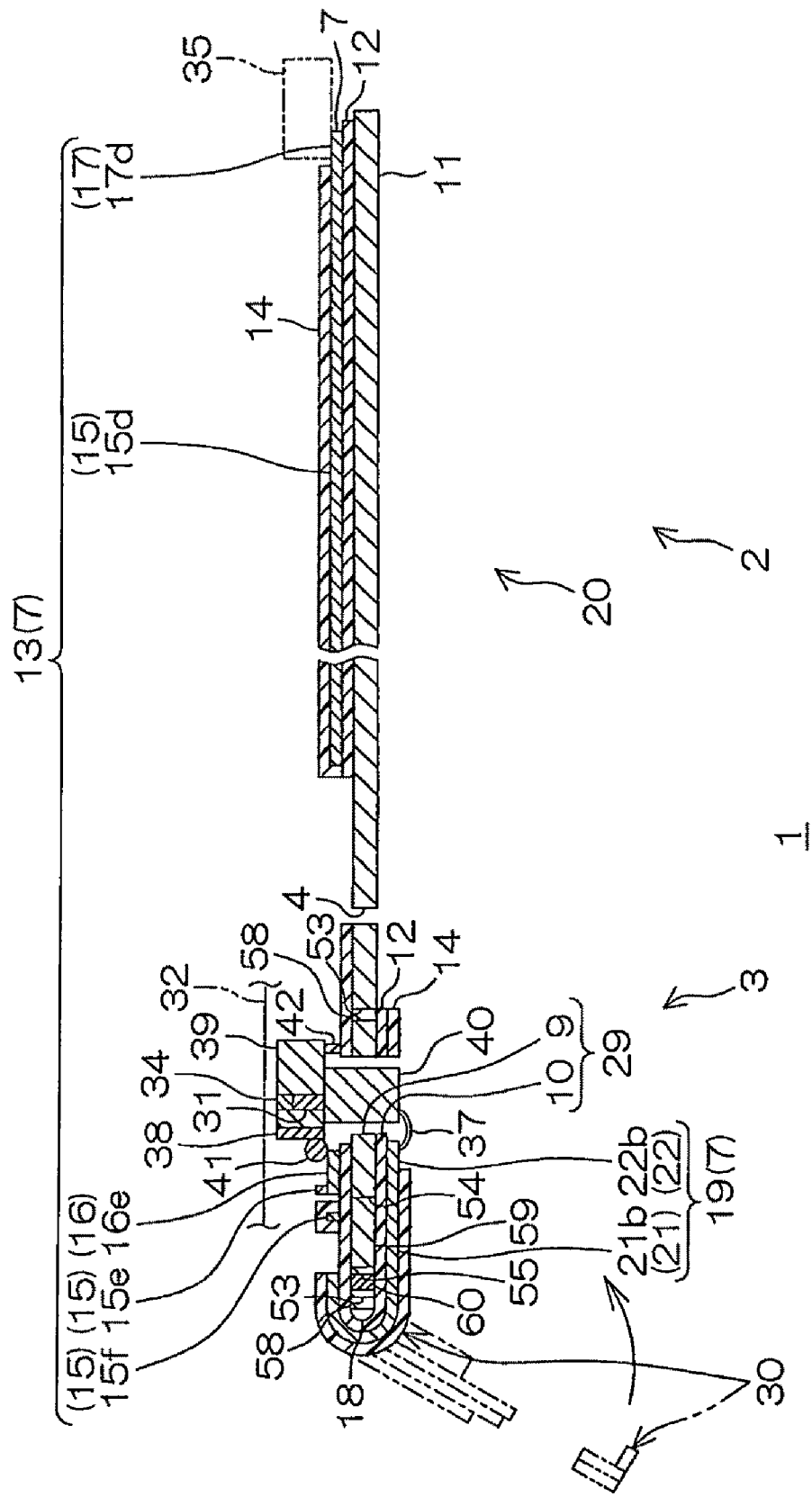
FIG. 7 is a cross-sectional view of the suspension board with circuit of FIG. 5 along the line B-B.

FIG. 1 is a plan view of a suspension board with circuit according to an embodiment of the present invention prior to a folding-back step (described later). FIG. 2 is a schematic view of a principal portion of a metal supporting board of the suspension board with circuit shown in FIG. 1. FIG. 3 is a cross-sectional view of the suspension board with circuit shown in FIG. 1 along the line A-A. FIG. 4 is a process view for illustrating a producing method of the suspension board with circuit shown in FIG. 3. FIGS. 5 to 7 show the suspension board with circuit of FIG. 1 after the folding-back step, in which FIG. 5 is a plan view thereof, FIG. 6 is a bottom view thereof, and FIG. 7 is a cross-sectional view thereof along the line B-B of FIG. 5.

In FIGS. 1, 5, and 6, an insulating base layer 12 and an insulating cover layer 14, each described later, are omitted for clear illustration of relative positioning of a conductive pattern 7 described later.

As shown in FIG. 1, a suspension board with circuit 1 has an auxiliary portion 30 described later, which is folded back. A slider 39 for mounting thereon a magnetic head 38 described later, and a light emitting element 40 are mounted on the suspension board with circuit 1, and the suspension board with circuit 1 is used in a hard disk drive employing an optically assisted method.

First, the suspension board with circuit 1 before the auxiliary portion 30 is folded back is described in detail with reference to FIGS. 1 to 3.

In the suspension board with circuit 1, the conductive pattern 7 is supported on a metal supporting board 11.

The metal supporting board 11 is formed in a flat belt shape extending in a longitudinal direction, and integrally includes a board main body portion 20, and the auxiliary portion 30.

The board main body portion 20 is formed in a flat belt shape extending in the longitudinal direction, and integrally includes a wiring portion 2 disposed on one longitudinal side (hereinafter referred to as a rear side), and a mounting portion 3 disposed on the other longitudinal side (hereinafter referred to as a front side) of the wiring portion 2.

The wiring portion 2 is formed in a generally rectangular plan view shape extending in the longitudinal direction. The wiring portion 2 is defined in the board main body portion 20 as a region which is mounted with a back surface (lower surface) thereof facing downward on a load beam not shown.

The mounting portion 3 is defined in the board main body portion 20 as a region exposed from the load beam, together with the auxiliary portion 30 described next, without being mounted on the load beam when the wiring portion 2 is mounted on the load beam. Specifically, the mounting portion 3 is formed as one longitudinal end portion (front end portion) of the board main body portion 20 on which the slider 39 (the magnetic head 38 mounted thereon) is mounted.

Specifically, the mounting portion 3 is formed continuously from the front end of the wiring portion 2 into a generally rectangular plan view shape which protrudes on both outsides of the wiring portion 2 in a widthwise direction (direction perpendicular to the longitudinal direction).

The mounting portion 3 has a slit portion 4 formed in a generally U-shaped shape which opens toward the front side when viewed in plan view. The mounting portion 3 is partitioned into a gimbal portion 5 widthwise interposed in the slit portion 4, outrigger portions 8 disposed on both outsides of the slit portion 4 in the widthwise direction, and a wire turn-back portion 6 disposed on the front side of the gimbal portion 5 and the outrigger portions 8.

The gimbal portion 5 is for imparting flexibility to the operation of the slider 39 (see FIG. 7), disposed at the center of the mounting portion 3 in the both widthwise and front-to-rear directions, and formed in a generally rectangular plan view shape. The gimbal portion 5 is partitioned into a slider mounting region 43 and a head-side-terminal formation portion 45.

The slider mounting region 43 is for mounting the slider 39 (slider 39 for mounting thereon the magnetic head 38) on the surface (upper surface) thereof, disposed at the widthwise center of the gimbal portion 5, and defined in a generally rectangular plan view shape elongated in the widthwise direction.

The slider mounting region 43 has a main-body-side insertion opening 9 formed to extend through the suspension board with circuit 1 in a thickness direction (which is the thickness direction of the board main body portion 20 and the auxiliary portion 30 after the auxiliary portion 30 is folded back, as shown in FIG. 7).

The main-body-side insertion opening 9 is bored to be smaller than the slider 39 (see FIG. 7), and larger than the light-emitting element 40 when viewed in plan view, and formed in a generally rectangular plan view shape elongated in the widthwise direction. More specifically, the main-body-side insertion opening 9 is formed at the center of the slider mounting region 43 in the both longitudinal and widthwise directions.

Note that, when the auxiliary portion 30 is folded back, the main-body-side insertion opening 9 cooperates with an auxiliary-portion-side insertion opening 10 described later to form an insertion opening 29 as an opening. As shown in FIG. 7, the light emitting element 40 is inserted through the insertion opening 29.

The head-side-terminal formation portion 45 is a region which has the surface (upper surface) on which head-side terminals 16 are formed, and disposed on the front side of the slider mounting region 43. The head-side-terminal formation portion 45 is defined so as to extend in the widthwise direction.

The wire turn-back portion 6 is defined in a generally rectangular plan view shape elongated in the widthwise direction. On the front side of the wire turn-back portion 6, there is provided a protruding portion 27 which has the widthwise center portion thereof slightly protruding toward the front side.

The protruding portion 27 is formed in a generally rectangular plan view shape having a width slightly smaller than or equal to the width (widthwise length) of the gimbal portion 5, and defined as a region through which power source wires 21 described later pass.

The back surface (lower side) of the board main body portion 20 is formed with a main-body-side interfitting portion 52.

The main-body-side interfitting portion 52 includes a first main-body-side interfitting portion 53, and a second main-body-side interfitting portion 54.

The first main-body-side interfitting portion 53 is formed as a depressed portion which faces a first auxiliary-portion-side interfitting portion 58 described later, and interfits with the first auxiliary-portion-side interfitting portion 58 described later. That is, the first main-body-side interfitting portion 53 is formed in a generally line-symmetric shape with the first auxiliary-portion-side interfitting portion 58 described later with respect to a fold portion 18 described later when viewed in plan view.

Specifically, the first main-body-side interfitting portion 53 is formed in a generally rectangular frame-like plan view shape including a front groove widthwise extending along the front end edge of the protruding portion 27, a rear groove extending in parallel with the front groove and rearwardly of the slider mounting region 43 in the gimbal portion 5, and a pair of side grooves passing through the protruding portion 27, the wire turn-back portion 6, and the gimbal portion 5 to couple the both widthwise end portions of the front groove to the both widthwise end portions of the rear groove, which are integrally formed.

The second main-body-side interfitting portion 54 is formed as a depressed portion which faces a second auxiliary-portion-side interfitting portion 59 described later, and interfits with the second auxiliary-portion-side interfitting portion 59 described later. That is, the second main-body-side interfitting portion 54 is formed in a generally line-symmetrical shape with the second auxiliary-portion-side interfitting portion 59 described later with respect to the fold portion 18 described later when viewed in plan view.

Specifically, the second main-body-side interfitting portion 54 is a portion interior to and surrounded by the first main-body-side interfitting portion 53, which is disposed on the front side of the head-side-terminal formation portion 45 in adjacent relation thereto in the wire turn-back portion 6, and formed in a generally rectangular plan view shape elongated in the widthwise direction.

The first main-body-side interfitting portion 53 and the second main-body-side interfitting portion 54 are formed in the metal supporting board 11.

More specifically, the first main-body-side interfitting portion 53 and the second main-body-side interfitting portion 54 are formed as the opening extending through the metal supporting board 11 at the back surface of the board main body portion 20 in the thickness direction so as to expose the bottom surface of the insulating base layer 12 described later.

That is, the first main-body-side interfitting portion 53 and the second main-body-side interfitting portion 54 are defined by the side end surfaces of the opening mentioned above in the metal supporting board 11 and by the bottom surface of the insulating base layer 12.

The back surface of the board main body portion 20 is also formed with adhesive fill holes 55 each to be filled with an adhesive 60 described later.

The two adhesive fill holes 55 are formed at the boundary between the protruding portion 27 and the wire turn-back portion 6 and on the front side of the second main-body-side interfitting portion 54. The adhesive fill holes 55 are each formed as a circular hole extending through the metal supporting board 11 at the back surface of the board main body portion 20 in the thickness direction so as to expose the bottom surface of the insulating base layer 12 described later.

The auxiliary portion 30 is formed continuously from the board main body portion 20. Specifically, the auxiliary portion 30 is formed so as to extend from the front end of the protruding portion 27 of the wire turn-back portion 6 toward the front side. More specifically, the auxiliary portion 30 is formed in a generally rectangular plan view shape having generally the same width as that of the protruding portion 27.

The auxiliary portion 30 is partitioned into an element-side-terminal formation portion 46 and an auxiliary-portion-side opening formation portion 36.

The element-side-terminal formation portion 46 is a region having element-side terminals 22, described later, formed on the surface (the upper side, or the back surface (lower surface) when the auxiliary portion 30 is folded back, as shown in FIG. 7), and defined at the longitudinal center of the auxiliary portion 30.

The element-side-terminal formation portion 46 is disposed on the front side of the head-side-terminal formation portion 45 and opposite to the head-side-terminal formation portion 45 in spaced-apart relation. As shown in FIG. 7, the element-side-terminal formation portion 46 is disposed to face the head-side-terminal formation portion 45 in the thickness direction when the auxiliary portion 30 is folded back.

The auxiliary-portion-side opening formation portion 36 is a region defined on the front side of the element-side-terminal formation portion 46 in the auxiliary portion 30, and formed with the auxiliary-portion-side insertion opening 10 extending through the auxiliary portion 30 in the thickness direction thereof.

The auxiliary-portion-side insertion opening 10 is formed in a generally rectangular plan view shape elongated in the widthwise direction when viewed in plan view. The auxiliary-portion-side insertion opening 10 is located on the front side of the main-body-side insertion opening 9 and opposite to the main-body-side insertion opening 9 in spaced-apart relation. Specifically, the auxiliary-portion-side insertion opening 10 is formed in a line-symmetric shape with the main-body-side insertion opening 9 described above with respect to the fold portion 18 described later.

The back surface (the lower side, or the top surface (upper side) when the auxiliary portion 30 is folded back as shown in FIG. 7, which holds true hereinafter) of the auxiliary portion 30 is formed with an auxiliary-portion-side interfitting portion 57.

The auxiliary-portion-side interfitting portion 57 includes the first auxiliary-portion-side interfitting portion 58, and the second auxiliary-portion-side interfitting portion 59.

The first auxiliary-portion-side interfitting portion 58 is formed as a projecting portion which faces the first main-body-side interfitting portion 53, and interfits with the first main-body-side interfitting portion 53.

Specifically, the first auxiliary-portion-side interfitting portion 58 is formed in a generally rectangular flame-like plan view shape along the peripheral end edge of the auxiliary portion 30.

The second auxiliary-portion-side interfitting portion 59 is formed as a projecting portion which faces the second main-body-side interfitting portion 54, and interfits with the second main-body-side interfitting portion 54. The second auxiliary-portion-side interfitting portion 59 is formed in a generally line-symmetrical shape with the second main-body-side interfitting portion 54 with respect to the fold portion 18 described later when viewed in plan view.

Specifically, the second auxiliary-portion-side interfitting portion 59 is a portion interior to and surrounded by the first auxiliary-portion-side interfitting portion 58, which is disposed on the rear side of element-side terminals 22 described later in adjacent relation thereto in the element-side-terminal formation portion 46, and formed in a generally rectangular plan view shape elongated in the widthwise direction.

The auxiliary-portion-side interfitting portion 57 is formed of the metal supporting board 11.

More specifically, the auxiliary-portion-side interfitting portion 57 is formed of the metal supporting board 11 which remains in a pattern corresponding to the auxiliary-portion-side interfitting portion 57 on the back surface (lower side) of the auxiliary portion 30, and downwardly projects from the back surface of the insulating base layer 12.

In the suspension board with circuit 1, the fold portion 18 indicated by the imaginary line is provided on the boundary between the protruding portion 27 of the board main body portion 20 and the auxiliary portion 30.

The fold portion 18 is formed in a linear shape extending along the widthwise direction, and has notched portions 28 formed in the both widthwise end portions thereof. The notched portions 28 are formed by notching, in a widthwise inward direction, the respective both widthwise end portions of the board main body portion 20 and the auxiliary portion 30 into generally triangular plan view shapes.

In this manner, the fold portion 18 is formed as a fragile portion between the board main body portion 20 (protruding portion 27) and the auxiliary portion 30. Therefore, the auxiliary portion 30 can be folded back with respect to the board main body portion 20 such that the surface (back surface) of the fold portion 18 forms a mountain (valley) portion.

The notched portions 28 having the shapes described above can clearly show the position of the fold portion 18, and hence it is possible to easily and reliably perform a folding-back step (described later).

As shown in FIGS. 1 and 3, the conductive pattern 7 includes a first conductive pattern 13, and a second conductive pattern 19.

The first conductive pattern 13 is formed on the surface of the metal supporting board 11, and integrally includes external terminals 17 each as a first terminal, the head-side terminals 16 each as a second terminal, and signal wires 15 for connecting the external terminals 17 and the head-side terminals 16.

The plurality of (six) signal wires 15 are provided over the board main body portion 20 along the longitudinal direction, and arranged in parallel to be spaced apart from each other in the widthwise direction.

The plurality of signal wires 15 are formed of a first signal wire 15*a*, a second signal wire 15*b*, a third signal wire 15*c*, a fourth signal wire 15d, a fifth signal wire 15e, and a sixth signal wire 15f. The first signal wire 15a, the second signal wire 15b, the third signal wire 15c, the fourth signal wire 15d, the fifth signal wire 15e, and the sixth signal wire 15f are arranged in this order from one widthwise side toward the other widthwise side.

At the mounting portion 3, the first signal wire 15a, the second signal wire 15b, and the third signal wire 15c (one-side signal wires 15g) are formed and disposed to extend over and along the outrigger portion 8 on one widthwise side. On the other hand, the fourth signal wire 15d, the fifth signal wire 15e, and the sixth signal wire 15f (other-side signal wires 15h) are disposed to extend over and along the outrigger portion 8 on the other widthwise side.

The first signal wire 15a, the second signal wire 15b, the third signal wire 15c, the fourth signal wire 15d, the fifth signal wire 15e, and the sixth signal wire 15f are disposed to turn back at the wire turn-back portion 6, and reach the head-side-terminal formation portion 45. Specifically, the individual signal wires 15 are disposed to extend along the outrigger portions 8 till reaching the front end portions thereof on both widthwise outsides of the wire turn-back portion 6, where they bend to extend in the widthwise inward direction at the wire turn-back portion 6. Thereafter, the signal wires 15 further turn back toward the rear side to extend from the rear end of the wire turn-back portion 6 toward the rear side, and reach the front end portions of the head-side terminals 16 of the head-side-terminal formation portion 45.

Of the signal wires 15, the outermost first signal wire 15a and the outermost sixth signal wire 15f are formed apart from the outer end edges of the metal supporting board 11 with spaces where the power source wires 21 described later are formed being interposed therebetween.

The plurality of (six) external terminals 17 are provided to be disposed on the surface of the rear end portion of the wiring portion 2, and connected to the respective rear end portions of the individual signal wires 15. The external terminals 17 are arranged to be spaced apart from each other in the widthwise direction. The external terminals 17 are formed of a first external terminal 17a, a second external terminal 17b, a third external terminal 17c, a fourth external terminal 17d, a fifth external terminal 17e, and a sixth external terminal 17f which are connected correspondingly to the first signal wire 15a, the second signal wire 15b, the third signal wire 15c, the fourth signal wire 15d, the fifth signal wire 15e, and the sixth signal wire 15f, and arranged in this order from one widthwise side toward the other widthwise side.

The external terminals 17 are electrically connected to an external circuit board 35 as an external circuit, as indicated by the imaginary line of FIG. 7. Examples of the external circuit board 35 that may be used include a flexible wired circuit board.

The head-side terminals 16 are disposed on the surface of the mounting portion 3. More specifically, the head-side terminals 16 are disposed at the head-side-terminal formation portion 45 of the gimbal portion 5. The plurality of (six) head-side terminals 16 are provided so as to be connected to the respective front end portions of the individual signal wires 15.

More specifically, the head-side terminals 16 are arranged along the rear end edge (front end edge of the slider mounting region 43) of the head-side-terminal formation portion 45 to be spaced apart from each other in the widthwise direction.

The plurality of head-side terminals 16 are formed of a first head-side terminal 16a, a second head-side terminal 16b, a third head-side terminal 16c, a fourth head-side terminal 16d, a fifth head-side terminal 16e, and a sixth head-side terminal 16f. The third head-side terminal 16c, the second head-side terminal 16b, and the first head-side terminal 16a (one-side head-side terminals 16g) which are connected correspondingly to the third signal wire 15c, the second signal wire 15b, and the first signal wire 15a (the one-side signal wires 15g), and the sixth head-side terminal 16f, the fifth head-side terminal 16e, and the fourth head-side terminal 16d (other-side head-side terminals 16h) which are connected correspondingly to the sixth signal wire 15f, the fifth signal wire 15e, and the fourth signal wire 15d (the other-side signal wires 15h) are arranged in this order from one widthwise side toward the other widthwise side.

Each of the head-side terminals 16 is electrically connected to the magnetic head 38 via a solder ball 41 (see. FIG. 7).

In the first conductive pattern 13, a write signal transmitted from the external circuit board 35 is inputted to the magnetic head 38 of the slider 39 via the external terminals 17, the signal wires 15, and the head-side terminals 16, while a read signal read with the magnetic head 38 is inputted to the external circuit board 35 via the head-side terminals 16, the signal wires 15, and the external terminals 17.

The second conductive pattern 19 is formed on the surface of the metal supporting board 11, and integrally includes supply-side terminals 23 each as a third terminal, element-side terminals 22 each as a fourth terminal, and the power source wires 21 for connecting the supply-side terminals 23 and the element-side terminals 22.

The plurality of (two) power source wires 21 are provided along the longitudinal direction to extend over the board main body portion 20 and the auxiliary portion 30, and arranged in parallel to be spaced apart from each other in the widthwise direction.

The plurality of power source wires 21 are formed of a first power source wire 21a and a second power source wire 21b. The first power source wire 21a is disposed on one widthwise side, and the second power source wire 21b is disposed on the other widthwise side.

In the board main body portion 20, the first power source wire 21a and the second power source wire 21b are arranged apart from each other with a space where the signal wires 15 are formed being widthwise interposed therebetween. That is, in the board main body portion 20, the first power source wire 21a is disposed on one widthwise side (outside) of the first signal wire 15a. Also, in the board main body portion 20, the second power-source wire 21b is disposed on the other widthwise side (outside) of the sixth signal wire 15f.

Specifically, the first power source wire 21a is disposed on one widthwise side of the first signal wire 15a in spaced-apart relation at the outrigger portion 8, and disposed on the front side of the first signal wire 15a in spaced-apart relation at the wire turn-back portion 6. On the other hand, the second power source wire 21b is disposed on the other widthwise side of the sixth signal wire 15f in spaced-apart relation at the outrigger portion 8, and disposed on the front side of the sixth signal wire 15f in spaced-apart relation at the wire turn-back portion 6.

More specifically, the first power source wire 21a is disposed to extend along the first signal wire 15a at the outrigger portion 8 till reaching the wire turn-back portion 6, where it bends and extends toward the other widthwise side (inwardly). After bending toward the front side at the wire turn-back portion 6, the first power source wire 21a successively passes through the protruding portion 27 and the fold portion 18 to reach the element-side-terminal formation portion 46 of the auxiliary portion 30.

The second power source wire 21b is disposed to extend along the sixth signal wire 15f at the outrigger portion 8 till reaching the wire turn-back portion 6, where it bends and extends toward one widthwise side (inwardly). After bending toward the front side at the wire turn-back portion 6, the second power source wire 21*b* successively passes through the protruding portion 27 and the fold portion 18 to reach the element-side-terminal formation portion 46 of the auxiliary portion 30.

The plurality of (two) supply-side terminals 23 are provided to be disposed on the surface of the rear end portion of the wiring portion 2, and connected to the respective rear end portions of the individual power source wires 21. The supply-side terminals 23 are formed of a first supply-side terminal 23*a* and a second supply-side terminal 23*b* which are connected correspondingly to the first power source wire 21*a* and the second power source wire 21*b*. The first supply-side terminal 23*a* is disposed on one widthwise side, and the second supply-side terminal 23*b* is disposed on the other widthwise side.

The first supply-side terminal 23*a* and the second supply-side terminal 23*b* are disposed apart from each other with the space where the external terminals 17 are formed being widthwise interposed therebetween.

Additionally, the supply-side terminals 23 are formed to be disposed at the same positions as those of the external terminals 17 when projected in the widthwise direction. The supply-side terminals 23 are electrically connected to a power source (not shown) as the external circuit.

The element-side terminals 22 are disposed on the surface of the auxiliary portion 30 and, more specifically, disposed on the element-side-terminal formation portion 46. The plurality of (two) element-side terminals 22 are provided so as to be connected to the respective front end portions of the individual power source wires 21.

The element-side terminals 22 are arranged along the front end edge of the element-side-terminal formation portion 46 (the rear end edge of the auxiliary-portion-side insertion opening 10) to be spaced apart from each other in the widthwise direction. The element-side terminals 22 are formed of a first element-side terminal 22*a* and a second element-side terminal 22*b* which are connected correspondingly and respectively to the first power source wire 21*a* and the second power source wire 21*b*. The first element-side terminal 22*a* is disposed on one widthwise side, and the second element-side terminal 22*b* is disposed on the other widthwise side.

The element-side terminals 22 are disposed on the front side of the head-side terminals 16 and opposite to the head-side terminals 16 in spaced-apart relation. As shown in FIG. 7, when the auxiliary portion 30 is folded back, the element-side terminals 22 are positioned slightly rearward of the head-side terminals 16 when projected in the thickness direction.

As shown in FIG. 7, a terminal on the back-side portion (lower end portion) of the light-emitting element 40 is electrically connected to each of the element-side terminals 22 via a wire 37.

In the second conductive pattern 19, electric energy supplied from the power source is supplied to the light emitting element 40 via the supply-side terminals 23, the power source wires 21, and the element-side terminals 22 to cause the light emitting element 40 to emit high-energy light.

As shown in FIG. 3, the suspension board with circuit 1 includes the metal supporting board 11, the insulating base layer 12 formed on the surface of the metal supporting board 11, the conductive pattern 7 formed on the surface of the insulating base layer 12, and the insulating cover layer 14 formed on the surface of the insulating base layer 12 so as to cover the conductive pattern 7.

The metal supporting board 11 is formed of a metal material such as, e.g., stainless steel, a 42-alloy, aluminum, a copper-beryllium alloy, or phosphor bronze. Preferably, the metal supporting board 11 is formed of stainless steel. The thickness of the metal supporting board 11 is in a range of, e.g., 15 to 50 μm, or preferably 20 to 30 μm.

The insulating base layer 12 is formed to correspond to a portion where the conductive pattern 7 is to be formed, to the periphery and inside of the first main-body-side interfitting portion 53 (except for a portion where the main-body-side insertion opening 9 is to be formed), and to the first auxiliary-portion-side interfitting portion 58 and the inside thereof (except for a portion where the auxiliary-portion-side insertion opening 10 is to be formed).

Examples of an insulating material for forming the insulating base layer 12 include synthetic resins such as a polyimide resin, a polyamideimide resin, an acrylic resin, a polyether nitrile resin, a polyether sulfone resin, a polyethylene terephthalate resin, a polyethylene naphthalate resin, and a polyvinyl chloride resin. Preferably, the insulating base layer 12 is formed of a polyimide resin.

The thickness of the insulating base layer 12 is in a range of, e.g., 1 to 35 μm, or preferably 8 to 15 μm.

Examples of a conductive material for forming the conductive pattern 7 include copper, nickel, gold, a solder, and an alloy thereof. Preferably, the conductive pattern 7 is formed of copper.

The thickness of the conductive pattern 7 is in a range of, e.g., 3 to 50 μm, or preferably 5 to 20 μm.

The widths of each of the signal wires 15 and each of the power source wires 21 are in a range of, e.g., 10 to 200 μm, or preferably 20 to 100 μm. The spacing between the individual signal wires 15 is in a range of, e.g., 10 to 1000 μm, or preferably 20 to 100 μm. The spacing between the individual power source wires 21 is in a range of, e.g., 50 to 10000 μm, or preferably 100 to 1000 μm.

The widths of each of the external terminals 17, each of the head-side terminals 16, each of the supply-side terminals 23, and each of the element-side terminals 22 are in a range of, e.g., 20 to 1000 μm, or preferably 30 to 800 Ξm. The spacing between the individual external terminals 17, the spacing between the individual head-side terminals 16, and the spacing between the individual element-side terminals 22 are in a range of, e.g., 20 to 1000 μm, or preferably 30 to 800 μm. The spacing between the supply-side terminals 23 is in a range of, e.g., 50 to 10000 μm, or preferably 100 to 1000 μm.

The insulating cover layer 14 is disposed to correspond to the portion where the conductive pattern 7 is to be formed. Specifically, the insulating cover layer 14 is formed in a pattern which exposes the external terminals 17 and the head-side terminals 16, and covers the signal wires 15 correspondingly to the first conductive pattern 13. The insulating cover layer 14 is also formed in the pattern which exposes the supply-side terminals 23 (not shown in FIG. 3) and the element-side terminals 22, and covers the power source wires 21 correspondingly to the second conductive pattern 19.

The insulating cover layer 14 is formed of the same insulating material as the insulating material of the insulating base layer 12 mentioned above. The thickness of the insulating cover layer 14 is in a range of, e.g., 1 to 40 μm, or preferably 1 to 10 μm.

Next, a producing method of the suspension board with circuit 1 is described with reference to FIG. 4.

In the method, as shown in FIG. 4(*a*), the metal supporting board 11 is prepared first.

Next, as shown in FIG. 4(*b*), a varnish of a photosensitive insulating material is coated on the surface of the metal supporting board 11, dried, exposed to light, developed, and then cured by heating to form the insulating base layer 12 in the foregoing pattern.

Next, as shown in FIG. 4(c), the conductive pattern 7 is formed on the surface of the insulating base layer 12 by an additive method, a subtractive method, or the like.

Next, as shown in FIG. 4(d), a varnish of a photosensitive insulating material is coated on the surface of the insulating base layer 12 so as to cover the conductive pattern 7, dried, exposed to light, developed, and then cured by heating to form the insulating cover layer 14 in the foregoing pattern.

Next, as shown in FIG. 4(e), the slit portion 4, the main-body-side insertion opening 9, the auxiliary-portion-side insertion opening 10, the main-body-side interfitting portion 52 (i.e., the first main-body-side interfitting portion 53 and the second main-body-side interfitting portion 54), and the adhesive fill holes 55 are formed in the metal supporting board 11, and the auxiliary-portion-side interfitting portion 57 (i.e., the first auxiliary-portion-side interfitting portion 58 and the second auxiliary-portion-side interfitting portion 59) are formed from the metal supporting board 11. The slit portion 4, the main-body-side insertion opening 9, the auxiliary-portion-side insertion opening 10, the main-body-side interfitting portion 52 (i.e., the first main-body-side interfitting portion 53 and the second main-body-side interfitting portion 54), the adhesive fill holes 55, and the auxiliary-portion-side interfitting portion 57 (i.e., the first auxiliary-portion-side interfitting portion 58 and the second auxiliary-portion-side interfitting portion 59) are formed by, e.g., an etching method such as dry etching (e.g., laser processing) or wet etching (e.g., chemical etching), drilling perforation, or the like. Preferably, the slit portion 4, the main-body-side insertion opening 9, the auxiliary-portion-side insertion opening 10, the main-body-side interfitting portion 52, the adhesive fill holes 55, and the auxiliary-portion-side interfitting portion 57 are formed by wet etching.

Specifically, the main-body-side interfitting portion 52 (i.e., the first main-body-side interfitting portion 53 and the second main-body-side interfitting portion 54) and the adhesive fill holes 55 are formed as depressed portions in accordance with the method described above. That is, the main-body-side interfitting portion 52 and the adhesive fill holes 55 are formed by downwardly opening the metal supporting board 11 at the back surface of the board main body portion 20 in a pattern corresponding to the main-body-side interfitting portion 52 and the adhesive fill holes 55 so as to extend through the metal supporting board 11 at the back surface of the board main body portion 20 in the thickness direction, and expose the bottom surface of the insulating base layer 12.

On the other hand, the auxiliary-portion-side interfitting portion 57 (i.e., the first auxiliary-portion-side interfitting portion 58 and the second auxiliary-portion-side interfitting portion 59) is formed as a projecting portion in accordance with the method described above. That is, the auxiliary-portion-side interfitting portion 57 is formed by removing the auxiliary portion 30 except for the portion thereof corresponding to the auxiliary-portion-side interfitting portion 57 so as to leave the metal supporting board 11 at the back surface (lower side) of the auxiliary portion 30 in a pattern corresponding to the auxiliary-portion-side interfitting portion 57.

Simultaneously with the formation thereof, the metal supporting board 11 is trimmed, whereby the suspension board with circuit 1 integrally including the board main body portion 20 and the auxiliary portion 30 is obtained. Note that, in the trimming of the metal supporting board 11, the notched portions 28 are formed.

By forming the main-body-side interfitting portion 52 in the metal supporting board 11, and forming the auxiliary-portion-side interfitting portion 57 from the metal supporting board 11, it is possible to dispose the metal supporting board 11 of the board main body portion 20 and the metal supporting board 11 of the auxiliary portion 30 in the same plane when the main-body-side interfitting portion 52 and the auxiliary-portion-side interfitting portion 57 are interfitted in the folding-back step described later.

That is, the metal supporting board 11 of the board main body portion 20 and the metal supporting board 11 of the auxiliary portion 30 overlap each other when the suspension board with circuit 1 is projected in the widthwise direction thereof. This allows a reduction in the thickness of the suspension board with circuit 1.

Thereafter, as shown in FIGS. 5 to 7, the auxiliary portion 30 of the suspension board with circuit 1 is folded back with respect to the board main body portion 20 so as to face the back surface of the board main body portion 20 (folding-back step).

Specifically, first in the folding-back step, the adhesive fill holes 55 are filled with the adhesive 60. The adhesive 60 may appropriately be a known adhesive, and the adhesive fill holes 55 are filled therewith by a printing method or the like. Then, the auxiliary portion 30 is folded back with respect to the board main body portion 20 such that the back surface of the auxiliary portion 30 and the back surface of the board main body portion 20 are arranged adjacent to each other in the thickness direction.

Also, in the folding-back step, the auxiliary portion 30 is folded back such that the surface (back surface) of the fold portion 18 forms a mountain (valley) portion.

Further, in the folding-back step, the auxiliary-portion-side interfitting portion 57 (i.e., the first auxiliary-portion-side interfitting portion 58 and the second auxiliary-portion-side interfitting portion 59) are each upwardly inserted into the main-body-side interfitting portion 52 (i.e., the first main-body-side interfitting portion 53 and the second main-body-side interfitting portion 54) formed in the back surface of the board main body portion 20 to interfit therewith, and the auxiliary portion 30 is fixed to the board main body portion 20.

By interfitting the main-body-side interfitting portion 52 and the auxiliary-portion-side interfitting portion 57, and fixing the auxiliary portion 30 to the board main body portion 20, it is possible to stabilize the folded-back state of the auxiliary portion 30 with respect to the board main body portion 20 with a simple structure.

Specifically, by interfitting the first main-body-side interfitting portion 53 and the first auxiliary-portion-side interfitting portion 58, it is possible to reliably position the auxiliary portion 30 with respect to the metal supporting board 11. In addition, by interfitting the second main-body-side interfitting portion 54 and the second auxiliary-portion-side interfitting portion 59, it is possible to securely fix the auxiliary portion 30 to the metal supporting board 11.

Consequently, the main-body-side insertion opening 9 and the auxiliary-portion-side insertion opening 10 overlap each other in the thickness direction, and the respective inner circumferential surfaces thereof are at the same position when viewed in plan view. As a result, the insertion opening 29 as an opening extending through the board main body portion 20 and the auxiliary portion 30 in the thickness direction thereof is formed in the board main body portion 20 and in the auxiliary portion 30.

By thus folding back the auxiliary portion 30, the back surface (the lower side after the folding-back step) of the insulating base layer 12 of the board main body portion 20 and the back surface (the upper side after the folding-back step) of the insulating base layer 12 of the auxiliary portion 30, which face each other in the thickness direction, are joined together with the adhesive 60 (joining step).

In this manner, the folded-back state of the auxiliary portion 30 with respect to the board main body portion 20 can be maintained more reliably by a simple method.

Thereafter, in the board main body portion 20 (on the top side of the suspension board with circuit 1), the slider 39 having the light emitting element 40 mounted on the back surface thereof is mounted on the slider mounting region 43 via an adhesive 42 such that the light emitting element 40 is inserted through the insertion opening 29. Specifically, the slider 39 is mounted on the slider mounting region 43 via the adhesive 42 provided around the insertion opening 29 (main-body-side insertion opening 9) so as to cover the insertion opening 29 from thereover. As a result, the light emitting element 40 is inserted through the insertion opening 29.

In this manner, the mounted slider 39 is disposed on the side of the suspension board with circuit 1 which is closer to the board main body portion 20 when viewed in the thickness direction (direction in which the board main body portion 20 and the auxiliary portion 30 face each other).

On the other hand, the light emitting element 40 mounted on the slider 39 is disposed on the side of the suspension board with circuit 1 which is closer to the auxiliary portion 30 when viewed in the thickness direction (direction in which the board main body portion 20 and the auxiliary portion 30 face each other).

Note that, when the suspension board with circuit 1 is used in the hard disk drive, the slider 39 is disposed on the slider mounting region 43 so as to float from a magnetic disk 32 (see the imaginary line of FIG. 7), and travel relatively to the magnetic disk 32 while maintaining an extremely small gap therebetween. As shown in FIG. 7, on the slider 39, there are mounted the magnetic head 38, an optical waveguide 31, and a near-field light generating member 34.

The magnetic head 38 is mounted on a surface of the slider 39, and provided in facing relation to the magnetic disk 32 indicated by the imaginary line of FIG. 7 so as to be capable of performing a read operation and a write operation to the magnetic disk 32.

The optical waveguide 31 is provided for causing light emitted from the light emitting element 40, described next, to be incident upon the near-field light generating member 34, and formed to extend along the thickness direction. On the upper end of the optical waveguide 31, the near-field light generating member 34 is provided.

The near-field light generating member 34 is provided for generating near-field light from the light incident thereon through the optical waveguide 31, and irradiating the magnetic disk 32 with the near-field light to heat an extremely small region of the magnetic disk 32. The near-field light generating member 34 is formed of a metal scatterer, an opening, or the like. For example, a known near-field light generator described in Japanese Unexamined Patent No. 2007-280572, Japanese Unexamined Patent No. 2007-052918, Japanese Unexamined Patent No. 2007-207349, Japanese Unexamined Patent No. 2008-130106, or the like is employed.

The light emitting element 40 is a light source for causing light to be incident upon the optical waveguide 31, e.g., a light source which converts electric energy to optical energy, and emits high-energy light from an emission port.

The light emitting element 40 is mounted on the back surface of the slider 39 so as to be inserted through the insertion opening 29 of the metal supporting board 11. Also, the light emitting element 40 is mounted on the slider 39 such that the emission port thereof faces the optical waveguide 31.

The light emitting element 40 is formed to have a thickness larger than that of the metal supporting board 11. As a result, the lower end portion (back-surface-side end portion) of the light emitting element 40 protrudes further beyond the back surface of the metal supporting board 11.

Thereafter, the magnetic head 38 is electrically connected to each of the head-side terminals 16 via the solder ball 41, and the external circuit board 35 indicated by the imaginary line is connected to each of the external terminals 17. Subsequently, in the auxiliary portion 30 (on the back side of the suspension board with circuit 1), the light emitting element 40 is electrically connected to each of the element-side terminals 22 via the wire 37. On the other hand, in the board main body portion 20, the power source (not shown) is electrically connected to each of the supply-side terminals 23.

In this manner, the suspension board with circuit 1 (the embodiment of the suspension board with circuit of the present invention) on which the slider 39 having the magnetic head 38 and the light emitting element 40 has been mounted can be obtained.

Thereafter, in the hard disk drive, the wiring portion 2 is mounted on the surface of the load beam with the back surface thereof facing downward so as to be supported thereon.

In such a hard disk drive in which the suspension board with circuit 1 is mounted, an optically assisted method can be employed.

Specifically, in such a hard disk drive, the magnetic disk 32 indicated by the imaginary line of FIG. 7 travels relatively to the near-field light generating member 34 and to the magnetic head 38. Light emitted from the light emitting element 40 passes through the optical waveguide 31 to reach the near-field light generating member 34, and near-field light generated by the near-field light generating member 34 is applied to the surface of the magnetic disk 32 facing the near-field light generating member 34 from thereabove. By irradiation with the near-field light from the near-field light generating member 34, the surface of the magnetic disk 32 is heated and, in this state, information is recorded on the magnetic disk 32 with a magnetic field applied from the magnetic head 38. At that time, since the coersive force of the magnetic disk 32 has been reduced, the information can be recorded at a high density on the magnetic disk 32 by the application of a small magnetic field thereto.

In the suspension board with circuit 1, the external terminals 17, the head-side terminals 16, and the supply-side terminals 23 are each disposed on the board main body portion 20, while the element-side terminals 22 are disposed on the auxiliary portion 30.

That is, the element-side terminals 22 are disposed on the auxiliary portion 30 different from the board main body portion 20 on which the external terminals 17, the head-side terminals 16, and the supply-side terminals 23 are disposed.

This allows formation of the external terminals 17, the head-side terminals 16, and the supply-side terminals 23, each described above, at different low arrangement densities on the board main body portion 20, while allowing separate formation of the element-side terminals 22 described above at another different low arrangement density on the auxiliary portion 30. As a result, it is possible to prevent the above-mentioned short circuit between the terminals, and consequently achieve an improvement in the connection reliability of the conductive pattern 7.

In addition, by folding back the auxiliary portion 30 such that it faces the back surface of the board main body portion 20, it is possible to dispose the light emitting element 40 on the auxiliary portion 30 facing the back surface of the board main body portion 20, while allowing the magnetic head 38 to be disposed on the surface of the board main body portion 20. This can achieve compactization of the suspension board with circuit 1. Therefore, it is possible to compactly mount the suspension board with circuit 1 in the hard disk drive.

Moreover, since the light emitting element 40 and the slider 39 are disposed to face each other in the thickness direction, it is possible to dispose the light emitting element 40 in the vicinity of the slider 39, and cause light emitted from the light-emitting element 40 to be reliably incident upon the optical waveguide 31 of the slider 39. It is further possible to efficiently implement the optically assisted method with heat generated from the near-field light resulting from the conversion of light through the optical waveguide 31 and with a magnetic field applied from the magnetic head 38.

Further, in the suspension board with circuit 1, the slider 39 and the light emitting element 40 are respectively disposed on the top surface side (side closer to the board main body portion 20) and the back surface side (side closer to the auxiliary portion 30) of the suspension board with circuit 1.

Therefore, by electrically connecting the magnetic head 38 to the head-side terminals 16 with increased layout design flexibility on the top surface side, and electrically connecting the light emitting element 40 to the element-side terminals 22 with increased layout design flexibility on the back surface side, the layout design flexibility of each of the slider 39 and the light emitting element 40 can be increased.

Furthermore, in the suspension board with circuit 1, the main-body-side interfitting portion 52 formed in the back surface of the board main body portion 20 and the auxiliary-portion-side interfitting portion 57 formed at the back surface of the auxiliary portion 30 interfit with each other, and the auxiliary portion 30 is fixed to the board main body portion 20.

Therefore, in the suspension board with circuit 1, it is possible to stabilize the folded-back state of the auxiliary portion 30 with respect to the board main body portion 20 with a simple structure.

In the description given above, the first main-body-side interfitting portion 53, the second main-body-side interfitting portion 54, the adhesive fill holes 55, the first auxiliary-portion-side interfitting portion 58, and the second auxiliary-portion-side interfitting portion 59 are formed by penetrating the metal supporting board 11 in the thickness direction. However, it is also possible to form the first main-body-side interfitting portion 53, the second main-body-side interfitting portion 54, the adhesive fill holes 55, the first auxiliary-portion-side interfitting portion 58, and the second auxiliary-portion-side interfitting portion 59 by, e.g., cutting into the metal supporting board 11 midway in the thickness direction, though not shown.

In that case, the first main-body-side interfitting portion 53, the second main-body-side interfitting portion 54, and the adhesive fill holes 55 are defined by the bottom surface and side surfaces of the metal supporting board 11 which are formed by cutting into the metal supporting board 11 midway in the thickness direction.

On the other hand, the first auxiliary-portion-side interfitting portion 58 and the second auxiliary-portion-side interfitting portion 59 are formed of the metal supporting board 11 projecting from the back surface thereof.

In the description given above, the supply-side terminals 23 are provided on the board main body portion 20. However, it is also possible to, e.g., provide the supply-side terminals 23 on the auxiliary portion 30, as indicated by the imaginary line of FIG. 1. In that case, the power source wires 21 are disposed on the auxiliary portion 30.

In such a suspension board with circuit 1, both of the external terminals 17 and the head-side terminals 16 are disposed on the board main body portion 20, while both of the supply-side terminals 23 and the element-side terminals 22 are disposed on the auxiliary portion 30.

That is, the supply-side terminals 23 and the element-side terminals 22 are disposed on the auxiliary portion 30 different from the board main body portion 20 on which the external terminals 17 and the head-side terminals 16 are disposed.

This allows formation of the external terminals 17 and the head-side terminals 16 at different low arrangement densities on the board main body portion 20, while allowing separate formation of the supply-side terminals 23 and the element-side terminals 22 at other different low arrangement densities on the auxiliary portion 30. As a result, it is possible to prevent the above-mentioned short circuit between the terminals, and consequently achieve an improvement in the connection reliability of the conductive pattern 7.

In the description given above, the slider 39 (having the light emitting element 40 mounted thereon) is mounted on the suspension board with circuit 1 after being subjected to the folding-back step and the joining step. However, the order of the individual steps is not limited thereto. For example, it is also possible to first mount the slider 39 on the suspension board with circuit 1 that has not been subjected to the folding-back step and the joining step yet, and then perform the folding-back step and the joining step with respect to the suspension board with circuit 1 having the slider 39 mounted thereon.

In the description given above, the adhesive fill holes 55 are formed, and the back surface of the insulating base layer 12 of the board main body portion 20 and the back surface of the insulating base layer 12 of the auxiliary portion 30 are joined together with the adhesive 60 with which the adhesive fill holes 55 are filled. However, it is also possible to, e.g., join together the board main body portion 20 and the auxiliary portion 30 without forming the adhesive fill holes 55, though not shown.

In such a suspension board with circuit 1, the board main body portion 20 and the auxiliary portion 30 are joined together through the interfitting of the first main-body-side interfitting portion 53 and the first auxiliary-portion-side interfitting portion 58 and through the interfitting of the second main-body-side interfitting portion 54 and the second auxiliary-portion-side interfitting portion 59 without using the adhesive 60.

In terms of securely fixing the auxiliary portion 30 to the board main body portion 20, the adhesive fill holes 55 are formed, as shown in FIG. 1.

Figure 8:
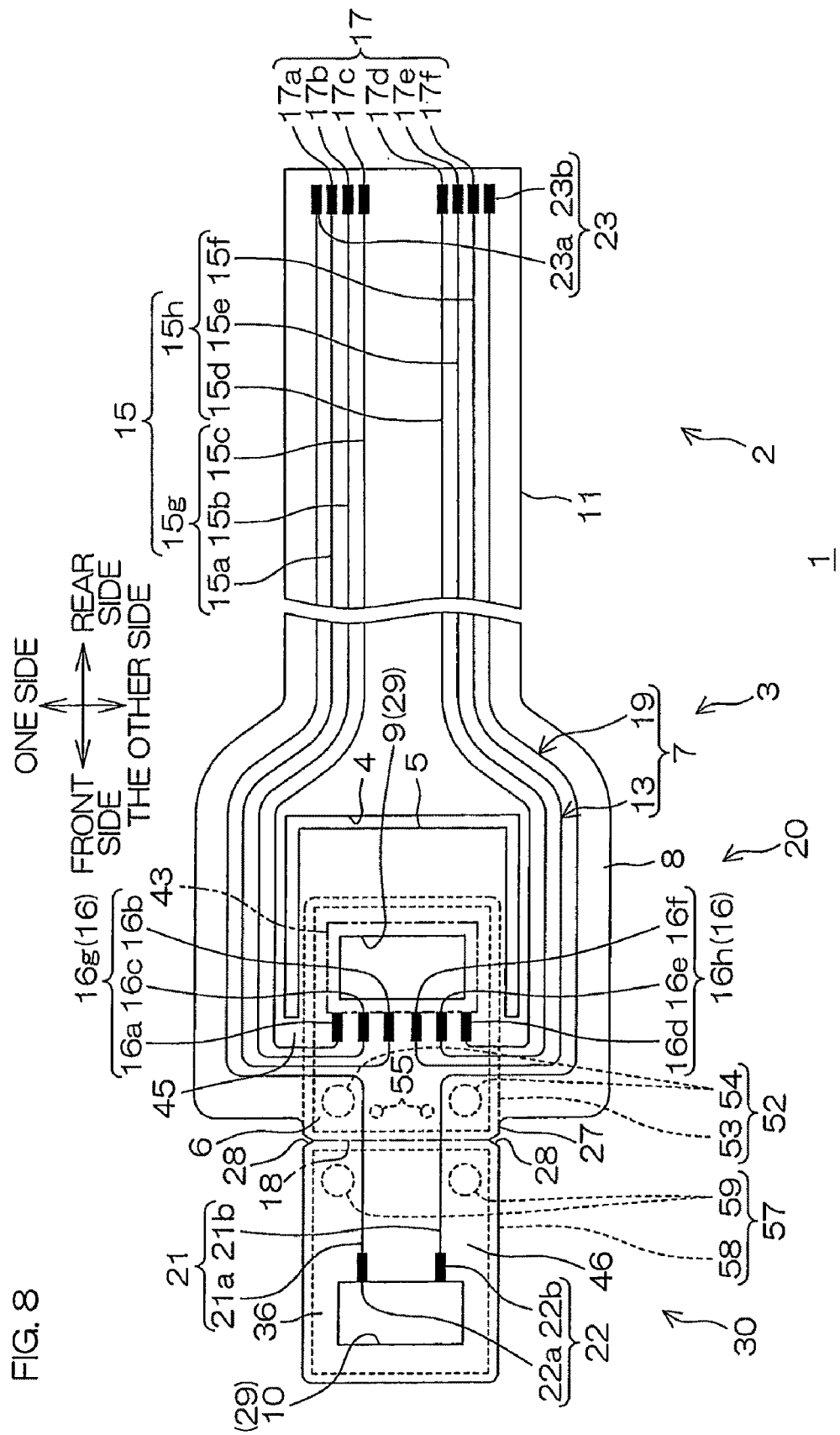
FIG. 8 is a plan view of a suspension board with circuit according to another embodiment of the present invention prior to the folding-back step.
Figure 9:
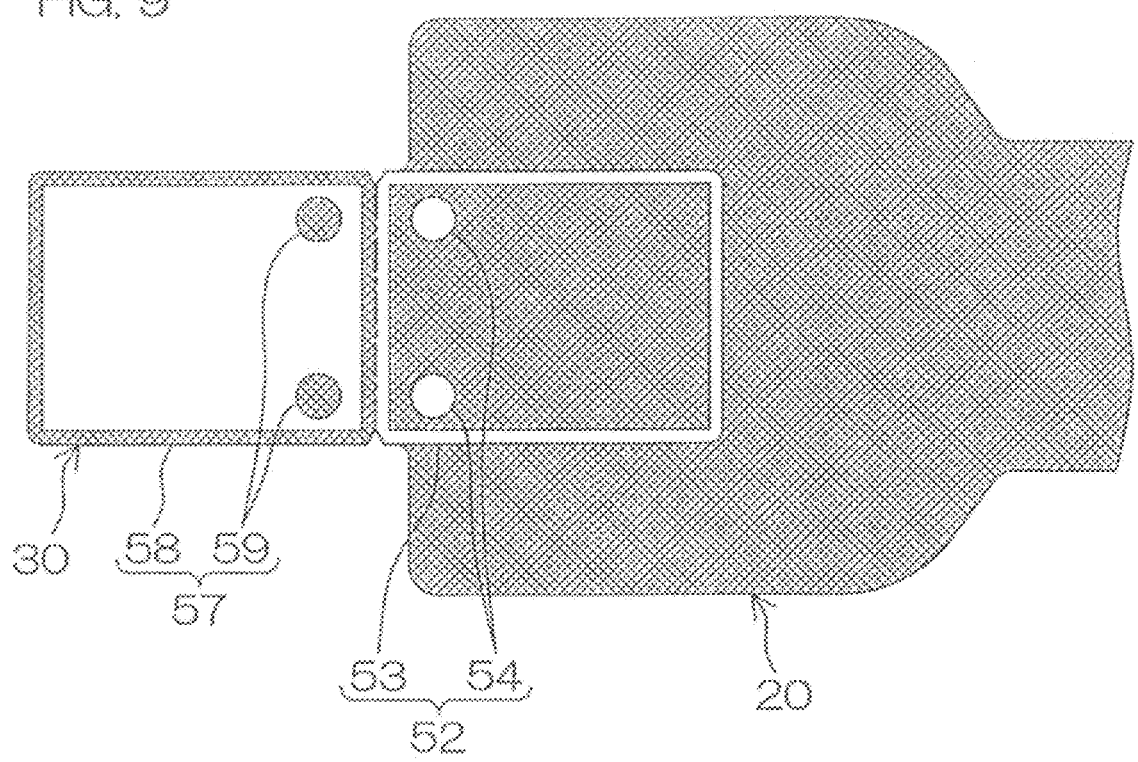
FIG. 9 is a schematic view of a principal portion of the metal supporting board of the suspension board with circuit shown in FIG. 8.

FIG. 8 is a plan view of a suspension board with circuit according to another embodiment of the present invention prior to the folding-back step. FIG. 9 is a schematic view of a principal portion of the metal supporting board of the suspension board with circuit shown in FIG. 8. The members corresponding to the individual members described above are designated by the same reference numerals in each of the drawings referenced hereinafter, and a detailed description thereof is omitted.

In the description given above, the one second main-body-side interfitting portion 54 and the one second auxiliary-portion-side interfitting portion 59 are each formed in a generally rectangular plan view shape. However, the number, position, shape, and size of each of the second main-body-side interfitting portion 54 and the second auxiliary-portionside interfitting portion 59 are not particularly limited. For example, as shown in FIGS. 8 and 9, it is also possible to form a plurality of the (two) second main-body-side interfitting portions 54 and a plurality of the (two) second auxiliary-portion-side interfitting portions 59 each in a generally circular plan view shape, and dispose them in mutually spaced-apart relation.

Specifically, the two second main-body-side interfitting portions 54 are provided in the wire turn-back portion 6 in spaced-apart relation such that the power source wires 21 are interposed therebetween. Also, the two second auxiliary-portion-side interfitting portions 59 are provided in spaced-apart relation correspondingly to the two second main-body-side interfitting portions 54 such that the power source wires 21 are interposed therebetween.

Figure 10:
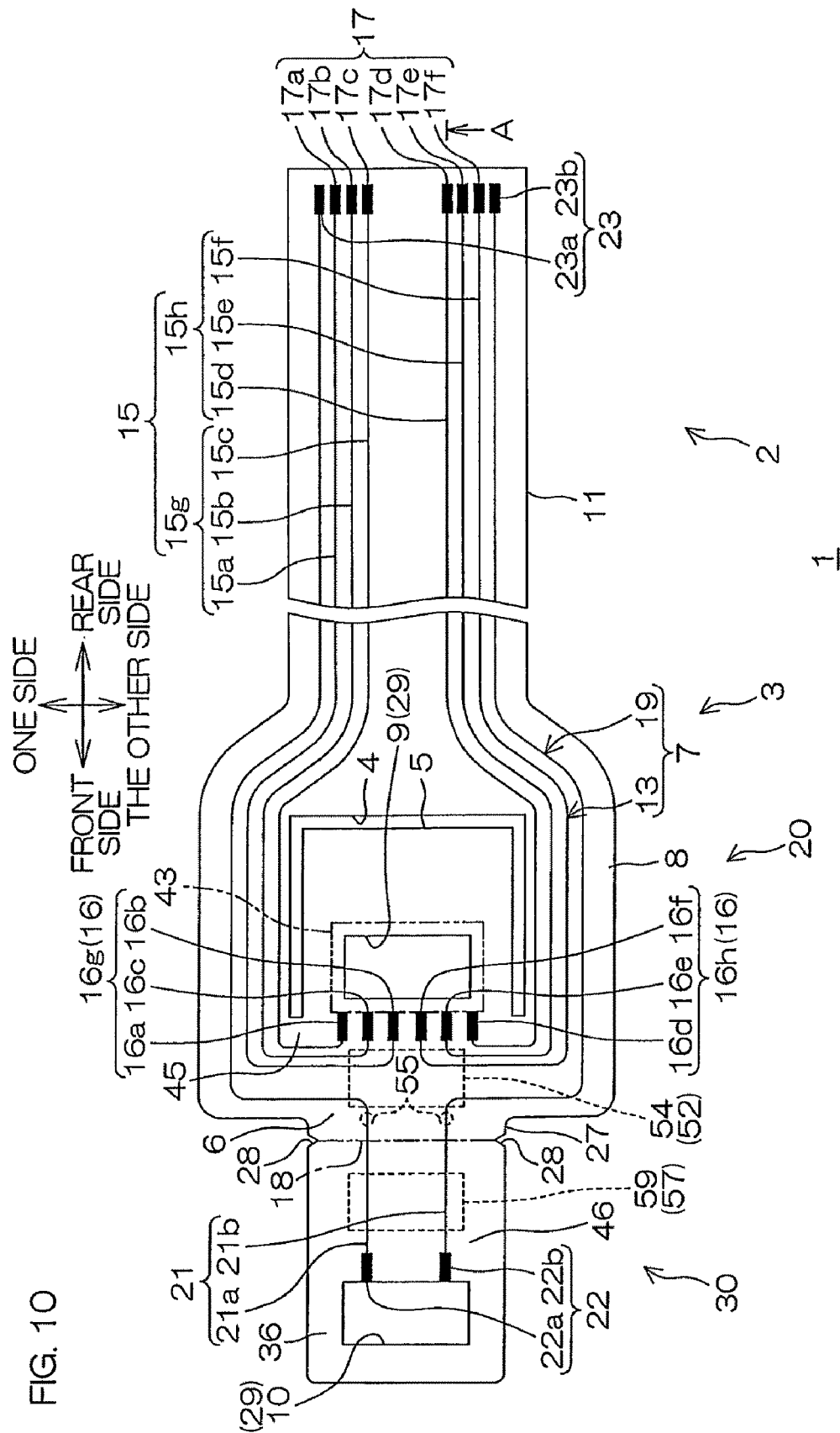
FIG. 10 is a plan view of a suspension board with circuit according to still another embodiment of the present invention prior to the folding-back step.
Figure 11:
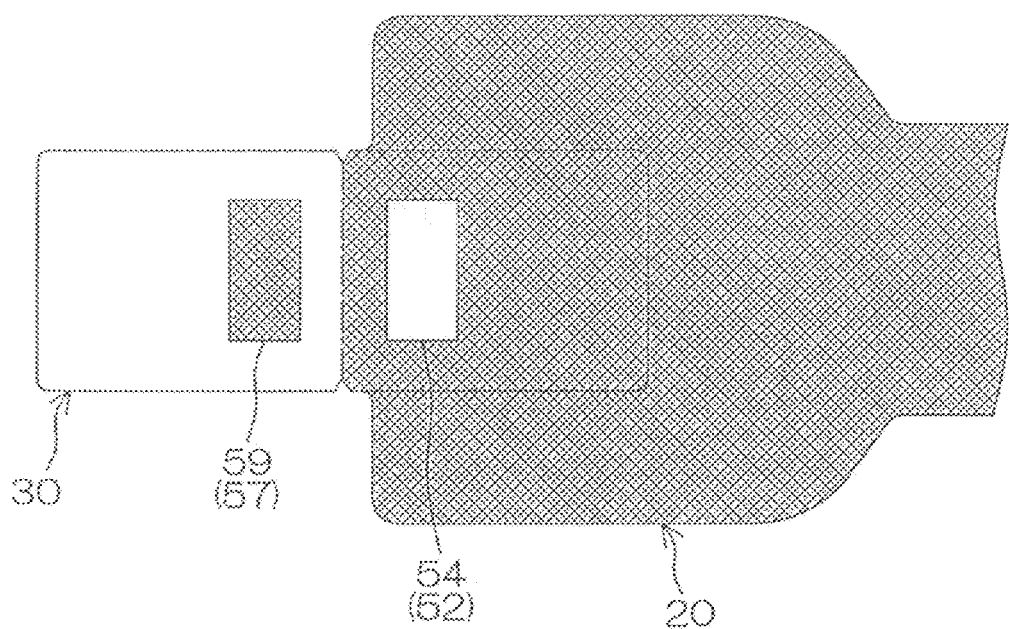
FIG. 11 is a schematic view of a principal portion of the metal supporting board of the suspension board with circuit shown in FIG. 10.

FIG. 10 is a plan view of a suspension board with circuit according to still another embodiment of the present invention prior to the folding-back step. FIG. 11 is a schematic view of a principal portion of the metal supporting board of the suspension board with circuit shown in FIG. 10. The members corresponding to the individual members described above are designated by the same reference numerals in each of the drawings referenced hereinafter, and a detailed description thereof is omitted.

In the description given above, the first main-body-side interfitting portion 53 and the first auxiliary-portion-side interfitting portion 58 are formed, and interfitted with each other. However, as shown in FIGS. 10 and 11, it is also possible to, e.g., form the suspension board with circuit 1 without forming the first main-body-side interfitting portion 53 and the first auxiliary-portion-side interfitting portion 58.

Preferably, as shown in FIG. 1, the first main-body-side interfitting portion 53 and the first auxiliary-portion-side interfitting portion 58 are formed and, as shown in FIGS. 5 to 7, the first auxiliary-portion-side interfitting portion 58 is inserted into the first main-body-side interfitting portion 53 to interfit therewith.

By forming the first main-body-side interfitting portion 53 and the first auxiliary-portion-side interfitting portion 58 as shown in FIG. 1, and inserting the first auxiliary-portion-side interfitting portion 58 into the first main-body-side interfitting portion 53 to bring them into interfitting relation, as shown in FIGS. 5 to 7, it is possible to precisely position the auxiliary portion 30 with respect to the board main body portion 20.

Additionally, by forming the first auxiliary-portion-side interfitting portion 58 at the peripheral end edge of the auxiliary portion 30, it is possible to improve the mechanical strength of the auxiliary portion 30.

Figure 12:
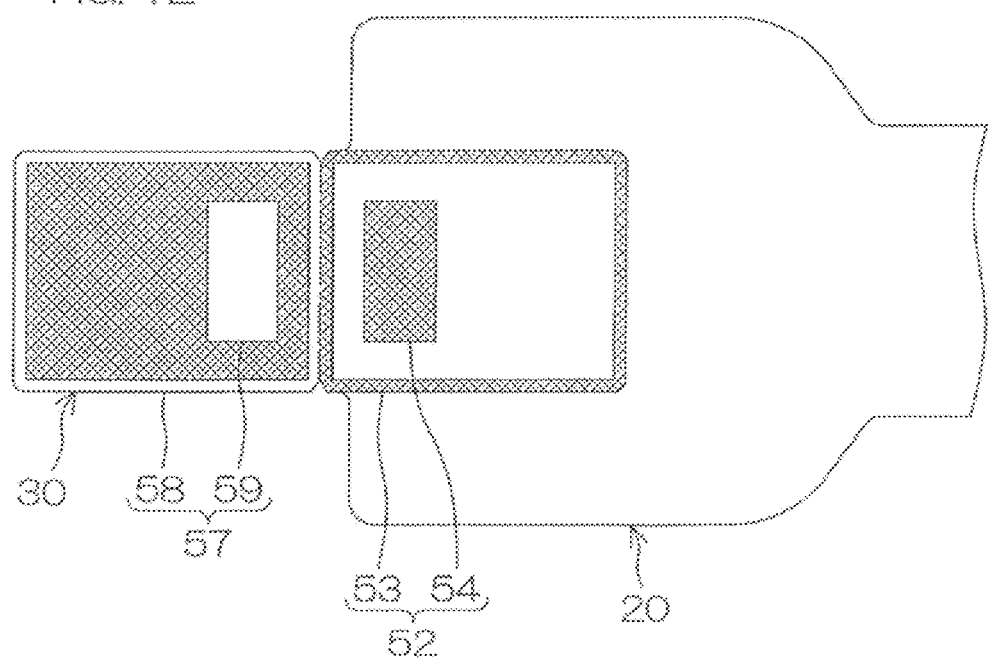
FIG. 12 is a schematic view of a principal portion of the metal supporting board of a suspension board with circuit according to yet another embodiment of the present invention prior to the folding-back step.

FIG. 12 is a schematic view of a principal portion of the metal supporting board of a suspension board with circuit according to yet another embodiment of the present invention prior to the folding-back step. The members corresponding to the individual members described above are designated by the same reference numerals in each of the drawings referenced hereinafter, and a detailed description thereof is omitted.

In the description given above, the main-body-side interfitting portion 52 is formed as a depressed portion, and the auxiliary-portion-side interfitting portion 57 is formed as a projecting portion. However, as shown in FIG. 12, it is also possible to form the main-body-side interfitting portion 52 as a projecting portion, and form the auxiliary-portion-side interfitting portion 57 as a depressed portion.

While the illustrative embodiments of the present invention are provided in the above description, such is for illustrative purpose only and it is not to be construed limitative. Modification and variation of the present invention that will be obvious to those skilled in the art is to be covered by the following claims.

What is claimed is:

1. A suspension board with circuit comprising:
a conductive pattern;
a board main body portion;
an auxiliary portion formed continuously from the board main body portion, and folded back with respect to the board main body portion so as to face a back surface of the board main body portion;
a slider disposed on a side of the suspension board with circuit which is closer to the board main body portion in a direction in which the board main body portion and the auxiliary portion face each other, and mounting thereon a magnetic head electrically connected to the conductive pattern; and
a light emitting element disposed on a side of the suspension board with circuit which is closer to the auxiliary portion in the direction in which the board main body portion and the auxiliary portion face each other, and electrically connected to the conductive pattern, wherein the conductive pattern includes:
a first conductive pattern including a first terminal electrically connected to an external circuit, and a second terminal electrically connected to the magnetic head; and
a second conductive pattern including a third terminal electrically connected to the external circuit, and a fourth terminal electrically connected to the light emitting element, wherein,
in the first conductive pattern, both of the first terminal and the second terminal are disposed on the board main body portion,
in the second conductive pattern, the third terminal is disposed on the board main body portion or on the auxiliary portion, and the fourth terminal is disposed on the auxiliary portion,
the back surface of the board main body portion is formed with a main-body-side interfitting portion,
a back surface of the auxiliary portion is formed with an auxiliary-portion-side interfitting portion,
either one of the main-body-side interfitting portion and the auxiliary-portion-side interfitting portion is formed as a projecting portion, while the other of the main-body-side interfitting portion and the auxiliary-portion-side interfitting portion is formed as a depressed portion,
the main-body-side interfitting portion and the auxiliary-portion-side interfitting portion interfit with each other, and
the auxiliary portion is fixed to the board main body portion.

2. The suspension board with circuit according to claim 1, wherein
the auxiliary-portion-side interfitting portion includes a first auxiliary-portion-side interfitting portion disposed along a peripheral end portion of the auxiliary portion, and a second auxiliary-portion-side interfitting portion disposed so as to be surrounded by the first auxiliary-portion-side interfitting portion, and
the main-body-side interfitting portion includes a first main-body-side interfitting portion facing the first auxiliary-portion-side interfitting portion, and a second main-body-side interfitting portion facing the second auxiliary-portion-side interfitting portion.

3. The suspension board with circuit according to claim 1, further comprising:
a metal supporting board; and an insulating base layer formed on a surface of the metal supporting board, wherein the conductive pattern is formed on a surface of the insulating base layer, the projecting portion is formed of the metal supporting board, and the depressed portion is formed in the metal supporting board.

4. The suspension board with circuit according to claim 1, wherein the slider and the light emitting element are disposed to face each other in a thickness direction.

5. The suspension board with circuit according to claim 1, wherein the slider includes an optical waveguide, the light emitting element is disposed on a back surface of the slider so as to face the optical waveguide in a thickness direction, and each of the board main body portion and the auxiliary portion is formed with an opening extending therethrough in the thickness direction thereof so as to allow the light emitting element to be inserted through the opening.

6. The suspension board with circuit according to claim 1, wherein the board main body portion is further formed with an adhesive fill hole to be filled with an adhesive, and the board main body portion and the auxiliary portion are joined together with the adhesive.

\* \* \* \* \*